(12) United States Patent
Avedissian et al.

(10) Patent No.: US 12,067,591 B2
(45) Date of Patent: *Aug. 20, 2024

(54) TRACKING ONLINE CONVERSIONS ATTRIBUTABLE TO OFFLINE EVENTS

(71) Applicant: Yahoo Ad Tech LLC, New York, NY (US)

(72) Inventors: Armen Avedissian, New York, NY (US); Nathan Janos, New York, NY (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,454

(22) Filed: Aug. 1, 2023

(65) Prior Publication Data
US 2024/0020728 A1   Jan. 18, 2024

Related U.S. Application Data

(63) Continuation of application No. 17/451,490, filed on Oct. 20, 2021, now Pat. No. 11,756,072, which is a
(Continued)

(51) Int. Cl.
| | |
|---|---|
| *G06Q 30/00* | (2023.01) |
| *G06Q 30/02* | (2023.01) |
| *G06Q 30/0241* | (2023.01) |
| *G06Q 30/0242* | (2023.01) |
| *G06Q 30/0251* | (2023.01) |

(Continued)

(52) U.S. Cl.
CPC ......... *G06Q 30/0246* (2013.01); *G06Q 30/02* (2013.01); *G06Q 30/0269* (2013.01); *G06Q 30/0277* (2013.01); *G06T 1/0021* (2013.01); *G06T 1/0064* (2013.01); *H04L 67/00* (2013.01); *H04N 21/41415* (2013.01)

(58) Field of Classification Search
None
See application file for complete search history.

(56) References Cited

U.S. PATENT DOCUMENTS

| | | | |
|---|---|---|---|
| 5,818,907 A  * | 10/1998 | Maloney | G07C 1/10 379/85 |
| 6,810,384 B1 | 10/2004 | Cooper | |

(Continued)

OTHER PUBLICATIONS

Kaptain; Real-Time Adaptation of Influence Strategies in Online Selling; HICSS; pp. 3100-3109; 2014.*
(Continued)

*Primary Examiner* — Radu Andrei
(74) *Attorney, Agent, or Firm* — Bookoff McAndrews, PLLC

(57) ABSTRACT

Systems and methods are provided for determining a quantity of network location visitors that are likely generated or encouraged by specific offline events. A corresponding number of leads may then be attributed to and associated with those specific events. Ongoing conversion activity of those visitors may be tracked and associated with the offline events. Conversions of those visitors may be attributed entirely or partially to one or more specific offline events. The effectiveness of each offline may then be evaluated based on aggregate lead and conversion information.

20 Claims, 6 Drawing Sheets

Related U.S. Application Data continuation of application No. 16/586,004, filed on Sep. 27, 2019, now Pat. No. 11,176,572, which is a continuation of application No. 14/060,235, filed on Oct. 22, 2013, now Pat. No. 10,467,653.

(60) Provisional application No. 61/783,751, filed on Mar. 14, 2013.

(51) Int. Cl.
   *G06T 1/00* (2006.01)
   *H04L 67/00* (2022.01)
   *H04N 21/414* (2011.01)

(56) References Cited

U.S. PATENT DOCUMENTS

| | | | |
|---|---|---|---|
| 7,085,774 B2 | 8/2006 | Shah et al. | |
| 7,158,943 B2 | 1/2007 | Riet | |
| 7,895,121 B2 | 2/2011 | Lukose et al. | |
| 8,229,458 B2 | 7/2012 | Busch | |
| 8,510,770 B1 | 8/2013 | Oztaskent et al. | |
| 8,965,786 B1* | 2/2015 | Frumkin | G06Q 30/0242 705/14.6 |
| 2001/0007097 A1* | 7/2001 | Kim | G06Q 30/0217 705/14.19 |
| 2003/0009755 A1 | 1/2003 | Allibhoy et al. | |
| 2004/0073809 A1* | 4/2004 | Wing Keong | G06F 21/36 726/28 |
| 2004/0102980 A1* | 5/2004 | Reed | G06Q 30/02 705/1.1 |
| 2004/0194131 A1 | 9/2004 | Ellis et al. | |
| 2005/0260590 A1 | 11/2005 | Sahara et al. | |
| 2006/0004628 A1 | 1/2006 | Axe et al. | |
| 2007/0073585 A1 | 3/2007 | Apple et al. | |
| 2007/0124767 A1 | 5/2007 | Laskowski-Bender et al. | |
| 2007/0157230 A1* | 7/2007 | Mardirossian | H04N 7/163 725/35 |
| 2008/0065474 A1 | 3/2008 | Sharma et al. | |
| 2008/0147498 A1 | 6/2008 | Chao et al. | |
| 2008/0147848 A1 | 6/2008 | Zadikario et al. | |
| 2008/0222531 A1 | 9/2008 | Davidson et al. | |
| 2008/0235088 A1 | 9/2008 | Weyer et al. | |
| 2008/0255904 A1* | 10/2008 | Park | G06Q 30/0242 705/7.29 |
| 2009/0161929 A1 | 6/2009 | Oba et al. | |
| 2009/0187479 A1 | 7/2009 | Hartline et al. | |
| 2009/0292994 A1 | 11/2009 | Lwo | |
| 2010/0049602 A1 | 2/2010 | Softky | |
| 2011/0113438 A1* | 5/2011 | Patil | H04N 21/4784 725/40 |
| 2011/0197224 A1* | 8/2011 | Meijer | H04N 21/812 386/E5.003 |
| 2011/0239246 A1* | 9/2011 | Woodward | G06Q 10/10 725/35 |
| 2011/0251904 A1 | 10/2011 | Shapira et al. | |
| 2011/0302024 A1 | 12/2011 | Gunawardana et al. | |
| 2011/0307385 A1 | 12/2011 | Pierre et al. | |
| 2012/0022944 A1 | 1/2012 | Volpi | |
| 2012/0029983 A1 | 2/2012 | Rodriguez et al. | |
| 2012/0054019 A1 | 3/2012 | Kitts et al. | |
| 2012/0054021 A1 | 3/2012 | Kitts et al. | |
| 2012/0072280 A1 | 3/2012 | Lin | |
| 2012/0253945 A1 | 10/2012 | Gao et al. | |
| 2012/0296735 A1 | 11/2012 | Hari et al. | |
| 2013/0036434 A1* | 2/2013 | Shkedi | H04N 21/25891 725/14 |
| 2013/0151179 A1 | 6/2013 | Gray | |
| 2013/0268553 A1* | 10/2013 | Surry | G06F 16/248 707/769 |
| 2013/0282497 A1 | 10/2013 | Forman et al. | |
| 2013/0290096 A1 | 10/2013 | Lizotte | |
| 2014/0019249 A1 | 1/2014 | Nicholas et al. | |
| 2014/0040020 A1* | 2/2014 | Shanmugam | G06Q 30/02 705/14.45 |
| 2014/0101064 A1* | 4/2014 | Bedard | G06Q 50/01 705/319 |
| 2014/0244368 A1 | 8/2014 | Singhania et al. | |
| 2016/0034948 A1* | 2/2016 | Zhong | G06Q 30/0246 705/14.45 |

OTHER PUBLICATIONS

Treesinthuros; An empirical study of tracking strategies of e-commerce websites; Univ Thailand; 4 pages; 2006.*

Hermet; A methodology to monitor cellular transactional itinerary; 10th International Conference on Mobile Business; IEEE 2011; pp. 307-312, 2011.

Mayer; Third-Party Web Tracking: Policy and Technology; 2012 IEEE Symposium on Security and Privacy; IEEE 2012; pp. 413-427; 2012.

Kaptain; Real-Time Adaptation of Influence Strategies in Online Selling; HICSS 2014; p. 3100-3109; 2014.

Treesinthuros; An empirical study of tracking strategies of e-commerce websites; IEEE 2012; 4 pages; 2012.

* cited by examiner

TRACKING ONLINE CONVERSIONS ATTRIBUTABLE TO OFFLINE EVENTS

PRIORITY CLAIM

This patent application is a continuation of and claims the benefit of priority to U.S. Nonprovisional patent application Ser. No. 17/451,491, filed Oct. 20 2021, which is a continuation of and claims the benefit of priority to U.S. Nonprovisional patent application Ser. No. 16/586,004, filed Sep. 27, 2019, now U.S. Pat. No. 11,176,572, issued Nov. 16, 2021, which is a continuation of and claims the benefit of priority to U.S. Nonprovisional patent application Ser. No. 14/060,235, filed Oct. 22, 2013, now U.S. Pat. No. 10,467,653, issued Nov. 5, 2019, which claims the benefit of priority to U.S. Provisional Patent Application No. 61/783,751, filed Mar. 14, 2013, each of which is herein incorporated by reference in its entirety.

TECHNICAL FIELD

This disclosure generally relates to computer systems and methods for associating activities performed online with offline events.

BACKGROUND

For various reasons, it is desirable to measure usage of online network-connected resources, and to attribute portions of such use to offline stimuli, such as TV or radio advertisements. Yet measuring effectiveness of TV advertisements is far more challenging than with online ads. Similarly, optimizing ads to a target demographic is far more difficult with TV than with online media. Customers almost always view ads on TV and make purchases (i.e. "convert") through other channels including online purchases.

The most common industry approach for understanding who is viewing TV advertisements is the use of viewer panels. These are volunteer users who allow their activities to be monitored. The Nielsen panel contains 25,000 users (out of approximately 114.5 million television households) and so the Nielsen sample is less than 0.022% of population.

Other techniques for tracking TV ads include embedding special offers, phone numbers or tracking URLs into the advertisement. When a customer calls in to order, the company can uniquely identify the airing which the customer viewed because they use the phone number, URL, or redeem the offer. Such methods are generally referred to as "linking keys". Linking keys have limited applications since only a small fraction of the population will ultimately use the embedded key—often customers convert without these tracking devices.

Various systems have attempted to attribute conversions to television ads using statistical models, such as those described in US Patent Application Publications 2012/0054019 and 2012/0054021.

SUMMARY

Various embodiments of systems and methods are provided herein for attributing online activities to offline events such as television, radio and print advertisements. In one embodiment, an event attribution system comprises a network location server accessible to a plurality of client devices that may request data from the network location server, a lead recognition server configured to uniquely identify client devices requesting data from the network location server and to associate identified client devices with unique identifiers, a lead database containing unique client-device identifiers, request times and request metadata for a plurality of client devices that have requested data from the network location server, an offline event database containing time, date, location, and metadata for a plurality of offline events, a channel attribution module configured to associate client device request events with one or more channels through which client device requests are made to the network location, and an offline event attribution module configured to associate client device request events with offline events.

In another aspect, the offline event attribution module may associate client request events with offline events differently based on one or more channels with which the client request events are associated. In another aspect, the offline event attribution module may be further configured to determine a lift in a number of client device requests received within a pre-determined time relative to an offline event. In another aspect, the system may include an activity tracking module configured to identify activities of identified requesting client devices that occur subsequent to a first request by the client devices. In another aspect, the lead recognition server may identify client devices using cookies. Alternatively, the lead recognition server may identify client devices using device fingerprinting techniques. In various embodiments, the offline events may be television advertisement airings, radio advertisement airings, print publication events, billboard posting events, or others.

Another embodiment provides a computer readable medium containing instructions which, when executed perform the steps of: determining a baseline number of unique network location visitors during a baseline measurement time period prior to an ad spot air time; counting a measurement number of unique visitors to the network location during a measurement time period beginning at the ad spot air time; calculating a lift quantity by subtracting the baseline number from the measurement number; and attributing a number of visitors equal to the lift quantity to the ad spot in a database.

In another aspect, the computer readable medium may further include instructions for writing to a database of unique users, and attributing visitors to the ad spot by associating selected unique visitor records in the database with an identifier uniquely representing the ad spot in the database. The computer readable medium may further comprise instructions for randomly selecting visitor records to be associated with the ad spot identifier from a group of unique visitors arriving during the measurement period. Alternatively, visitor records to be associated with the ad spot identifier may be selected based at least in part on one or more demographic details associated with the visitor records. Alternatively, visitor records to be associated with the ad spot identifier may be selected based at least in part on a geographic location associated with the visitor records.

In another aspect, the computer readable medium may further comprise instructions for tracking conversion activities of a visitor attributed to the ad spot, where the conversion activities occur after a first-time visit by the visitor. The computer readable medium may also include instructions for associating the conversion activities with the ad spot, and to use the purchasing activities associated with the ad spot to determine a return on investment for the ad spot.

In one aspect, the baseline time period used by the computer readable medium may be the same length as the measurement time period. Alternatively, the baseline time period may be a different length (e.g., longer or shorter) than the measurement time period. The baseline or measurement time period may be less than one hour, less than one week, less than one day, or a different length of time.

The unique visitors may arrive at the network location via a direct channel without a referrer, or via a channel selected from the group consisting of organic brand search, organic non-brand search, brand-based pay-per-click ads, non-brand-based pay-per-click ads, affiliates, display ads, social networking sites, re-targeting display banners, online video sites, mobile device apps, and mobile devices browsers.

Another embodiment provides a computer readable medium containing instructions which, when executed perform the steps of: determining a baseline number of unique visitors arriving at a network location via a first channel during a baseline time period; measuring a total number of unique visitors arriving at the network location via the first channel during a measurement time period; calculating a first channel lift quantity by subtracting the baseline number from the total number; determining a number of unique visitors to associate with advertisements for the first channel; determining a distribution of visitors to be associated with ad spots; from a set of visitor records of unique visitors that arrived via the first channel, selecting visitor records to be associated with a plurality of ad spots; and associating the selected visitor records with the plurality of ad spots.

In one aspect, the computer readable medium may further include instructions for repeating all steps for unique visitors arriving at the network location via a second channel. The first or the second channel may be selected from the group consisting of organic brand search, organic non-brand search, brand-based pay-per-click ads, non-brand-based pay-per-click ads, affiliates, display ads, social networking sites, re-targeting display banners, online video sites, mobile device apps, and mobile devices browsers.

In another aspect, the computer readable medium may further include instructions for normalizing a baseline quantity to a 24 hour period.

In another aspect, the computer readable medium may further include instructions for determining a distribution of visitors to be associated with ad spots based at least partly on a number of gross impressions associated with the plurality of ad spots. In another aspect, the step of selecting visitor records may comprise randomly selecting a plurality of visitor records. Alternatively, the step of selecting visitor records may comprise selecting visitor records based on at least one demographic datum associated with the visitor records.

In another embodiment, a computer-implemented method of attributing online activities to offline television advertisements, the method may comprise counting a baseline number of unique network location visitors during a baseline measurement time period prior to an ad spot air time; counting a measurement number of unique visitors to the network location during a measurement time period beginning at the ad spot air time; calculating a lift quantity by subtracting the baseline number from the measurement number; and attributing a number of visitors equal to the lift quantity to the ad spot in a database; said method performed by a computer system that comprises one or more computing devices.

In one aspect, the method may further comprise maintaining a database of unique visitors, wherein attributing visitors to the ad spot comprises associating selected unique visitor records in the database with an identifier uniquely representing the ad spot in the database. In another aspect, the visitor records to be associated with the ad spot identifier may be selected randomly from a group of unique visitors arriving during the measurement period. Alternatively, the visitor records to be associated with the ad spot identifier may be selected based at least in part on one or more demographic details associated with the visitor records. Alternatively, the visitor records to be associated with the ad spot identifier are selected based at least in part on a geographic location associated with the visitor records.

In another aspect, the method may further comprise tracking conversion activities of the visitors attributed to the ad spot. In another aspect, the conversion activities may be associated with the ad spot. In another aspect, the conversion activities associated with the ad spot may be used to determine a return on investment for the ad spot.

In another aspect, the baseline time period may be the same length as the measurement time period or a different length (e.g., a longer or shorter time period).

Another embodiment provides method of attributing online activities to offline television advertisements, the method comprising determining a baseline number of unique visitors arriving at a network location via a first channel during a baseline time period; measuring a total number of unique visitors arriving at the network location via the first channel during a measurement time period; calculating a first channel lift quantity by subtracting the baseline number from the total number; determining a number of unique visitors to associate with advertisements for the first channel; determining a distribution of visitors to be associated with ad spots; from a set of visitor records of unique visitors that arrived via the first channel, selecting visitor records to be associated with a plurality of ad spots; and associating the selected visitor records with the plurality of ad spots; said method performed by a computer system that comprises one or more computing devices.

In one aspect, the method may further comprise repeating all steps for unique visitors received via a second channel. In another aspect, the method may further comprise normalizing a baseline quantity to a 24 hour period. In another aspect, determining a distribution of visitors to be associated with ad spots may be performed at least partly on the basis of a number of gross impressions associated with the plurality of ad spots. In another aspect, the step of selecting visitor records may comprise randomly selecting a plurality of visitor records. Alternatively, selecting visitor records may comprise selecting visitor records based on at least one demographic datum associated with the visitor records.

Many other embodiments and aspects of the various systems and methods will become apparent from the following detailed description and the attached drawings.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION OF SPECIFIC EMBODIMENTS

The various embodiments of systems and methods described herein provide for attribution of online leads and conversions to specific offline media events, such as television advertisements. The present inventors have determined that in some cases it may be less important to determine exactly which leads and conversions were influenced by TV ads than it is to track an appropriate number of leads and conversions that may be reasonably inferred to have been caused or influenced by a TV ad.

Thus, the various embodiments described herein provide systems and methods for determining a quantity of leads that are likely generated or encouraged by specific offline (e.g., television) ad spots, then attributing a corresponding number of leads to those specific ad spots, and tracking ongoing conversion activity of those leads. As a result, any conversions resulting from those leads may be attributed entirely or partially to one or more specific TV ad spots. The effectiveness of each ad spot may then be evaluated based on aggregate lead and conversion information.

By combining a system for identifying unique users (such as a device fingerprinting system or unique identifiers stored in cookies, flash cookies, local shared objects or other client-side files) with a lead attribution system, it is possible to track online activities of users and to correlate a portion of such online activity with offline events such as television and radio ads. Either or both of such systems may operate in real time or retrospectively using stored data.

Figure 1:
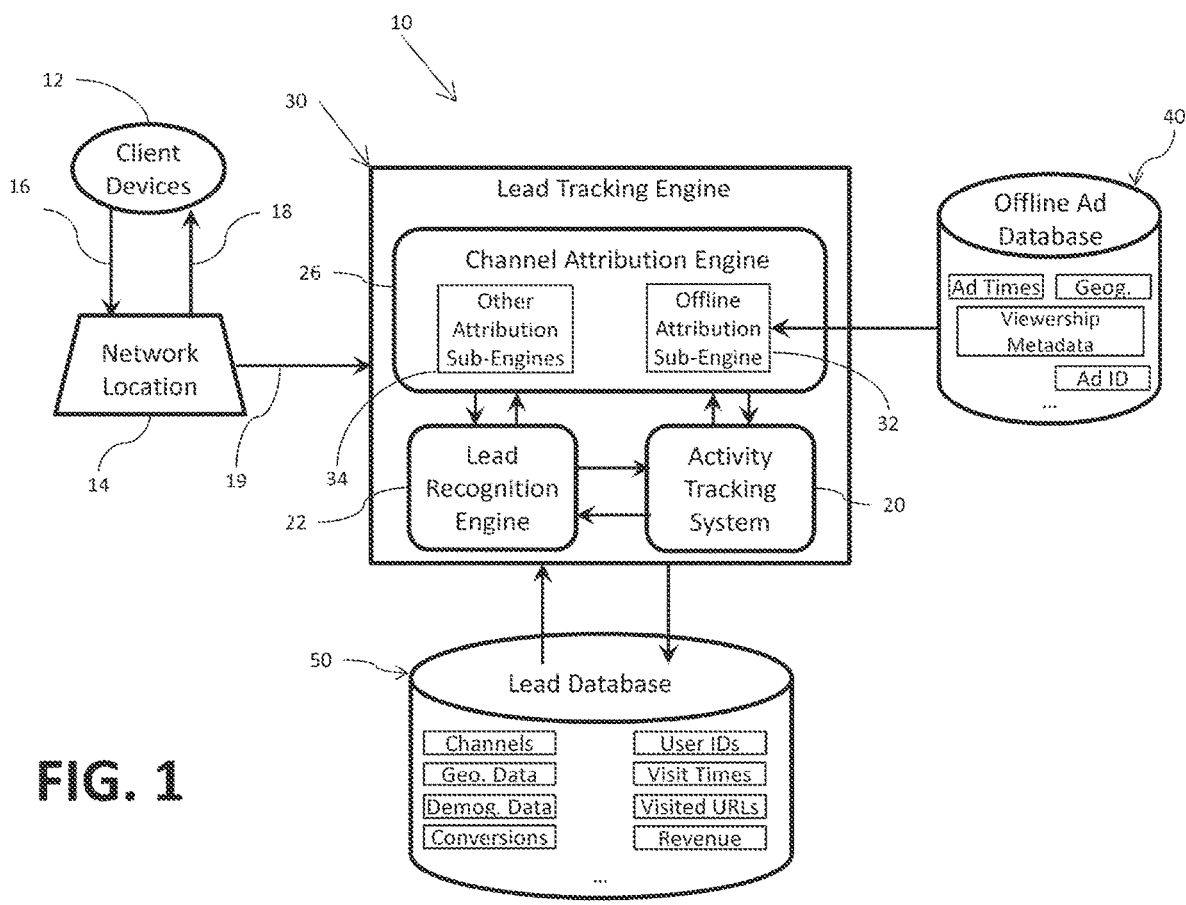
FIG. 1 is a block diagram illustrating components of an embodiment of a conversion attribution system.

FIG. 1 is a block diagram illustrating common elements in some embodiments of a conversion tracking and attribution system 10, such as those described herein. In such a system 10, a plurality of user-controlled client devices 12 (often numbering in the hundreds, thousands or millions of user-controlled devices) may send data 16 to one or more devices at a network location 14, and may receive data 18 from the network location 14. A device (e.g., a server) at the network location 14 may also transmit 19 client-device-request information to a lead tracking engine 30. A lead tracking engine 30 may be configured to recognize and identify leads and to track any or all visit, use or conversion activities performed by those recognized leads. Some embodiments of a lead tracking engine 30 may also include a channel attribution engine 26 configured to associate certain conversion or usage activities of leads with one or more access channels. Some embodiments of a lead tracking engine 30 may also include a lead recognition engine 22 configured to recognize a returning lead. Some embodiments of a lead tracking engine 30 may include an activity tracking engine 20 configured to identify and recognize specific activities performed by leads as being conversions or other activities to be tracked. In some embodiments, portions of a lead tracking engine 30 may use information from a database of offline advertisement data 40. Tracked lead information may be stored in a lead database 50.

As used herein, the term 'lead' may refer to a unique visitor to a website, web service, or any other network location. For example, a network location may include any server accessed as a result of a user's action on a computing device, even if the user is not aware of the client-server interaction. Such user interactions may be performed via a web browser, a web application, a mobile device application, a desktop application or any other mechanism. In some cases, the term 'lead' as used herein may carry a meaning synonymous with terms such as "user", "person" or "individual." In other cases, due to uncertainty as to an identity behind a 'lead', two or more leads may in fact be the same individual user. In other embodiments, a single 'lead' may be a single unique network-connected device operated by one or more users.

Typically, a single lead may interact with a network location many times. As used herein, each visit by a given lead may be referred to as a "visit" or a "visit event." In some embodiments, a "visit" or a "visit event" may be an individual request (e.g., an individual GET request from a particular device to a particular URL). In other embodiments, a visit may be a collection of requests received within a particular span of time. For example, within one browsing session, a user's device may send dozens, hundreds or even thousands of requests, even if the browsing session only lasts for a few minutes. Nonetheless, an entire browsing session may be recorded as a single "visit" for the purposes of some embodiments herein.

In some embodiments, a lead record may be initially created in a lead database for a unique first-time visitor to a particular network location. When and if that unique visitor returns to the network location at a later time to perform additional actions, including one or more actions defined as a conversion (e.g., making a purchase, creating an account, subscribing to a service or any other activity defined by an operator of a network location as a conversion), the lead record associated with that visitor may then be further associated with various data about the conversion activity, such as revenue, profit, return on investment, page views, etc. In some embodiments, a single visitor (lead) record may be associated with any number of conversion events or other activities of any variety of types.

Although in some embodiments, a lead record may have a one-to-one correlation with a single real person, it is not necessary to associate personally-identifying information with any particular lead record. In fact, it may be desirable to explicitly exclude any personally-identifying information from a lead database.

Internet Communications Technologies

Internet communications technologies generally use various standardized protocols designed to facilitate client-server interactions during which client devices send a request (or other information) to a server at a network location and the server responds with additional information or by performing some action. For example, most web-based interactions are performed using HTTP (hypertext transfer protocol) to allow users to view and manipulate information, and perform other actions with a website or other network location.

A typical web page is written in a markup language such as the Hypertext Markup Language (HTML) and/or a hypertext scripting language such as PHP. A web page typically includes a number of embedded objects (e.g., images, videos, client-executable scripts) referenced by respective Uniform Resource Locators (URLs). The web page itself is generally referenced by a URL, as well. When a user provides a URL of a web page to a web browser (e.g., by clicking a hyperlink identifying the URL to that web page, by directly typing in the URL of the web page or by otherwise directing a web browser or other application to request data from the URL), the web browser performs a detailed sequence of processing tasks to obtain that web page.

As an example, if the URL of the web page identifies a domain name of a server computer system on the Internet, the web browser first performs a Domain Name Service (DNS) lookup of the domain name to resolve this alphanumeric name into the Internet Protocol (IP) address of the web server on the Internet that can serve the web page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URLs that define other objects within the web page to be obtained by the web browser. As an example, an image, script or other object embedded within the web page is typically referenced with an embedded URL that specifies a server, and location (i.e., filename and directory path) within the server of that object. As the web browser encounters embedded URL's within the web page, the web browser repeats the sequence of processing described above to retrieve each embedded object from the respective URL. This can include performing additional DNS lookups, establishing server connections, and initiating an HTTP GET request (or POST or other request) to obtain the content associated with the embedded URL. Modern web pages often contain many embedded objects and URLs that reference these objects, often specifying different server computer systems from which to obtain these objects. As a result, the process of obtaining the complete content associated with a single web page including all embedded objects involves significant processing and communications activities.

Other internet communications between user-controlled client devices and servers at network locations may use other protocols and technologies. For example, many websites and web-based applications use Adobe Flash, HTML5, ActiveX, Java, PHP, etc. In addition to these network protocols, many mobile devices communicate with wireless networks using long-range wireless communications technologies such as GPRS, EDGE, UMTS, WCDMA, HSDPA, EVDO, WIMAX, and LTE, or short-range communication protocols such as WiFi, Bluetooth, RFID, NFC, etc. Some mobile devices may also be configured to run applications that communicate with network locations over one or more networks using WAP (wireless application protocol) or others.

As will be clear to the skilled artisan, in some embodiments, components of a conversion tracking and attribution system may utilize any suitable hardware configuration. For example, in some embodiments two or more components, such as a database server and an application server, may be implemented in a single hardware server device. In other embodiments, an application server and a database server may each comprise several hardware servers, depending on the anticipated request volume and other requirements of a particular system. Any other arrangement using any number of physical or virtual servers may alternatively be used. For example in some embodiments, some system components may use inexpensive commodity hardware. In some embodiments, some system components may reside in a "cloud" or virtual environment in which resources are shared, such as a network and/or virtual machines.

Client devices may include any of a variety of hardware and/or software elements capable of sending data requests to—and receiving responses from an application server. As used herein, computing devices, server, and network portal device refer to devices with a processor, memory (e.g. volatile storage) and accessible non-volatile data storage. The computing devices can comprise, for example, personal computers, server computers, main frame computers, computing tablets, set top boxes, mobile telephones, cellular telephones, personal digital assistants ("PDAs"), portable computers, notebook computers, RF readers, barcode readers, laptop computers or any variations thereof now in use or developed in the future. Computing devices may run an operating system, including, for example, variations of the Linux, Unix, Microsoft Disk Operating System ("MS-DOS"), Microsoft Windows, Palm OS, Symbian, Android OS, Apple Mac OS, and/or Apple iOS operating systems. In general, a computing device may be coupled with a display. For convenience, display representations can be referred to as a graphical user interface or GUI, but in general this is intended to refer to traditional GUI formats, three dimensional display representations and/or future developed display formats as well as variations thereof. Additionally, "volatile memory" as used herein refers to memory that requires power to maintain the information stored therein. Volatile memory can include, for example, random access memory ("RAM") or variations thereof, such as DRAM.

Furthermore, as used herein, a data storage device refers to any device configured to temporarily or permanently store information in a digital format. A data storage device can be physically integrated with a computing device or can be a distinct device coupled to a computing device through a wired or wireless network connection. A data storage device can comprise for example one or more disk storage devices such as tape drives (analog or digital), floppy disk drives, ZIP disk drives, holographic data storage units, optical disk drives such as CD, DVD or Blu-ray Disc drives, minidisc drives, or hard disk drives; or flash memory/memory card storage devices such as xD-Picture card, MultiMedia Card, USB flash drive, SmartMedia, Compact Flash, Secure Digital, Sony Memory Stick, or solid state drive; or read only memory ("ROM"); or any combinations thereof. Data stores described herein may be located on a single data storage device or may be distributed across a plurality of data storage devices in whole (e.g., mirrored) or in part.

In some embodiments, an activity tracking system and/or a lead recognition engine, or other systems may utilize objects embedded within a web page that may include one or more cookies, scripts or other software component configured to identify unique visitors and to track a user's activities on the website in order to identify conversion and other activities. In some embodiments, such scripts may also be configured to attribute recognized conversion activity to one or more advertisements, web pages, blog posts, searches or other information that may have influenced the conversion.

In some embodiments, a lead database 50 associated with an ad conversion tracking system may also contain information associating ad impressions, users, leads, conversion events, or other information with one or more of several channels. In some embodiments, associating users, leads or other data with a channel may be performed with the use of a channel attribution engine 26. In some embodiments, a channel attribution engine may also communicate with and use information from an advertisement database 40.

As used herein, the term "channel" carries its ordinary meaning as understood by those skilled in the art of online advertisement conversion tracking, and generally refers to one or more categories or pathways by which a user is directed to a website, online service or other network locations (such as mobile phone applications or downloadable digital media). For example, an "organic search" channel may identify those users who arrive at a website after performing a search with a search engine (such as GOOGLE.com). In some embodiments, an organic search channel may be sub-divided into "brand search" and "non-brand search" to distinguish cases in which users searched for a brand name from those in which users searched for some other term. As another example, a "direct" channel may include events in which a user visits a website by directly typing a URL into a web browser. Further examples of channels and channel attribution are described below.

Various database systems may be used in the systems and methods herein to track and store information about individual network location visitors, leads, conversions, channels, advertisement spots and any other information as desired. In various embodiments, such database systems may use any suitable computing hardware and database management system software as desired. For example, in some embodiments, any of the various database systems herein may comprise a relational database management system such as MYSQL, PostgreSQL, MS SQL Server, Oracle, Sybase, or any other suitable system. Database systems may also be accessible using any suitable query language, such as SQL, XQuery or others. As will be clear to the skilled artisan, a relational database typically contains a number of tables with inter-related information such that rows in one table may be associated with rows in another table by a common field such as a unique identifier. In alternative embodiments, any of the various types of NoSQL database management systems may be used (such as Key-value Store systems, BigTable systems, Document-Store systems and Graph Database systems). In some embodiments, a Persistent Distributed Key-Value Store database management system may be particularly well-suited to addressing latency and scaling constraints. In particular, distributed Key-Value Store databases are designed for efficient, low-latency read-write operations by key, usually through the use of a distributed hash table. Furthermore, such distributed Key-Values Store databases can be generally much easier to scale by adding more nodes and re-distributing the data. Examples of Key-Value Store database management systems include, but are not limited to, Virtuoso Universal Server, OpenLink Virtuoso, Membase, Memcached, MemcacheDB, Cassandra, Hbase Riak, Redis, and Couchbase.

Embodiments of Lead Tracking Engines

In various embodiments, a Lead Tracking Engine 30 may include a lead recognition engine 22 configured to recognize leads and an activity tracking system 20 configured to track activities of those leads with one or more network locations. In some embodiments, a lead recognition engine 22 may utilize any of various device fingerprinting techniques for consistently recognizing and identifying returning leads (e.g., users or devices). U.S. Pat. No. 6,496,824 titled "Session Management Over A Stateless Protocol", illustrates and describes a system for maintaining state over a stateless protocol by identifying unique users based on unique device fingerprints.

U.S. patent application Ser. No. 13/530,989 titled "Systems And Methods For Identifying A Returning Web Client" (hereafter, "the '989 Application"), which is incorporated herein by reference in its entirety, illustrates and describes systems, methods and data structures for rapidly identifying a matching device fingerprint of a returning client device in order to recognize returning leads or to identify a visiting client device as a first-time-visitor within milliseconds. In some embodiments, such device information may be further correlated with user-profile information (such as a list of client devices from which a single user has signed on to a service) to associate multiple recognized devices with a single user (or lead).

Once a lead associated with a particular event (e.g., a new visit or request to the network location) has been identified by the lead recognition engine, information about the event may be associated with the recognized lead record in the lead database 50.

An activity tracking system 20 may include features and systems for identifying and tracking activities performed by leads based on identified events. Sophisticated client-server software systems allow users to perform transactions within a network location such as purchasing goods or services. In some cases, such purchases may occur in one-time transactions or as one or more up-sells (e.g., a premium add-on service). Other types of transactions might involve subscribing to a service, making a reservation, signing up for an account, signing up to receive more information, providing personal information, sending or retrieving a message, navigating through a sequence of web pages to obtain desired content, performing searches for user specified information and so forth. Depending upon the purpose of the network location, any of these or other activities may be defined as a "conversion". In addition, non-conversion activities may also be tracked and associated with a lead.

In some embodiments each lead record in the lead database 50 may be associated with additional meta data about the visitor or about each unique visit. Such metadata may be determined by the activity tracking system, by the channel attribution engine or other systems, and may include information such as the date and time of the lead's first visit, the date and time of some or all return visits by the lead, a number of return visits, a specific URL(s) visited, a referrer or channel that directed the user to the network location, user agent information (e.g., a web browser used, a computer operating system, etc.), information from a social networking site, an IP address, geo-location data, etc.

A typical HTTP request includes the following information: the Uniform Resource Locator (URL) of the Web page to be accessed, a "User-Agent" header and might include also "Accept" and/or "Accept-Language" headers. The User-Agent header may indicate the browser sending the request and the operating system of the computer on which the browser is running. In some browsers, the language of the operating system may also be sent in the User-Agent header, while in others the OS language may be sent in the Accept-Language header. The Accept header contains the MIME types supported by the browser. The IP address of the client is part of the underlying IP packet. If the client is accessing the Internet through a proxy server, then it is the proxy's IP address which is sent as part of the underlying IP packet. Some proxies report the client's IP address in an additional HTTP header dedicated for that purpose, for example the "Forwarded-For" header or "Client-IP" header. Any of these pieces of information, information derived from these, or any other data may be associated with a lead record within a lead database 50.

In other embodiments, various additional attributes or pieces of information may be stored and associated with a particular lead record. For example, visit date/time information may be presented or stored in any desired format, such as a day part (e.g., "morning", "afternoon", "evening", "night"), a day of the week, an indication of weekday vs. weekend, a month, a quarter, a year, etc. To the extent such information is available and known for a given lead, geographic or demographic information such as a city, state, country, zip code, designated marketing area (DMA), a visitor's age, gender, education level, income level, marital status, etc. Any of these pieces of information, information derived from these, or any other data may be associated with a lead record within a lead database 50. As will be clear to the skilled artisan, a nearly infinite variety of metadata may be associated with any given lead.

As used herein, the terms "TV Ad spot," "ad spot" or simply "spot" may refer to a single airing of a single advertisement item (e.g., a television advertisement, television program, news program, radio ad, radio program, radio news piece, or other broadcast item to be tracked) on a particular station at a particular time, and possibly in a particular geographic region (e.g., time zone, zip code or DMA). In some embodiments, an identifier referring to a specific single advertisement spot may be stored in a database. Each ad spot identifier may also be associated with additional information, such as a television network on which the spot was aired, a network type (e.g., "news network", "broadcast network", "cable network"), a time at which the spot aired, a time zone in which the spot was aired, a television program during which the spot was aired, a marketing channel associated with the spot, an indication of whether the spot was paid (such as a paid advertisement) or unpaid (such as coverage by a news program), a time length of the spot, a rating size of a viewing audience, a linking key, etc. As will be clear to the skilled artisan, a nearly infinite variety of metadata may be associated with any given spot.

Additionally, television ratings data such as data gathered by the ratings firm NIELSEN COMPANY may be associated with one or more offline ad spots. Using data from the NIELSEN COMPANY or others, an ad spot may be associated with various items of meta-data providing further information about the ad spot. For example, such metadata may include a number of gross impressions (i.e., an estimated total number of television viewers to whom the spot was shown), a ratings share value (i.e., the percent of TV-equipped households in a particular geographic region), information describing the demographic breakdown of the likely viewers of an ad spot, or other quantitative or qualitative ratings information about an ad spot or likely viewers of an ad spot.

Various embodiments of the systems and methods described herein may comprise a lead conversion tracking and attribution system and/or database. A lead conversion tracking and attribution system may generally include any software and/or database system configured for associating leads and/or conversion events with one or more advertisement impressions to which a user/customer is exposed. When it comes to online ads and online sales, the advertisement responsible for a particular sale or other conversion event may generally be attributed through a process known as online conversion tracking. An online conversion tracking systems may generally be configured to track every online media event (e.g., banner ads, plain text ads, email ads, search results, online video ads, etc.) to which each user is exposed as well as each online conversion event. Conversion events may then be attributed to one or more online media events determined to have 'caused' or contributed to the conversion by linking a converted user to one or more media events presented to that user.

Many different online conversion tracking systems and methods exist, some of which attribute a conversion event entirely to the "last click," i.e. the final ad that is clicked leading to a customer making a purchase is given 100% of the credit for leading to the conversion. More sophisticated systems are able to attribute conversions to a wider range of online media events, potentially giving partial credit for a single conversion to multiple online media events. However, many conversion tracking systems are still generally limited to tracking connections between online media events and online conversion events.

Some systems exist for associating online conversion events with offline media events, such as TV, radio or print advertisements (e.g., newspaper ads, magazine ads, direct mail ads, etc.). Some systems for making such associations may utilize a linking key—a unique URL, promotional code or other identifying information that is specifically associated with a particular advertisement by the conversion tracking system. In addition to associating offline media events with actual online conversions, some embodiments of conversion tracking systems may be configured to track online pre-conversion events (i.e., network location visits or other online events by users that may convert in the future) which may also be associated with one or more offline media events.

In addition to online channels, a conversion tracking system database may also include offline channels such as "radio", "TV" or "print." Table 1 below lists several other online and offline channels that may be used in connection with various embodiments of the systems and methods described herein. A channel attribution engine 26 may generally be configured to identify a channel through which a particular visit event arrives at a network location, and may be configured to pass such information to other system components such that a lead record or a visit record for a particular lead may be associated with the identified channel. Various embodiments of an offline advertisement attribution engine 32 are described below. Attribution engines for other channels 34 may include any suitable available systems, components and methods.

TABLE 1

Examples of Marketing Channels to be Tracked

| Channel | Description |
|---|---|
| Organic Brand Search | SEO (Search Engine Optimization) for brand terms |
| Organic Non-Brand Search | SEO for non-brand terms |
| PPC Brand | SEM (Search Engine Monetization), search engine advertisements returned in response to brand search terms |
| PPC Non-Brand | SEM, search engine advertisements returned in response to non-brand search terms |
| Affiliates | Emails, blog posts or other information produced or distributed by affiliated sites or users |
| Display | Banner advertisements |
| Business Development | Revenue Sharing Partnerships |
| Social | Social media sites such as Facebook, Twitter, Pinterest, LinkedIn, etc. |
| Email | Acquisition Emails |

TABLE 1-continued

Examples of Marketing Channels to be Tracked

| Channel | Description |
|---|---|
| Re-targeting | Display Banner Campaigns |
| Direct | Direct Visits to the network location under evaluation |
| Radio | Radio Advertisements |
| Print/Out-of-Home/offline | Print, Direct Mail, Billboards, Point of Sales, 800 numbers, etc. |
| Mobile | Digital Phones, Tablets |
| TV | Television advertising attribution |
| Online Video | Ads or links from online video sites such as YouTube, Hulu, etc. |
| Others/WOM | Other Channel/Word-of Mouth |

Attributing Online Leads to TV Ad Spots (Single Channel)

In some embodiments, a portion of the lead visits received through a single channel, such as a "Direct" channel may be attributed to a specific television advertisement spot based on the timing of the lead visits relative to the ad spot. Various embodiments of such methods may involve defining a measurement window as a period of time following the time an advertisement is aired. Measurement may include determining a total number of leads received during the measurement window. Subtracting a baseline number of leads from the total measurement provides a "lift" or an increase in direct lead traffic that may be attributed to the ad spot. In some embodiments, the baseline may be established by determining a number of lead visits received during a baseline measurement period. In some embodiments, the baseline measurement period may be the same time duration as the measurement period, and may occur immediately prior to the spot start time.

In some embodiments, lead visits detected during a baseline period and/or during a measurement period may be counted only once for each unique lead, even if a single lead is associated with multiple lead events during a baseline or measurement period. This may be made possible by the lead recognition engine. In such cases, each lead may be associated with a time and metadata from the first, last or average of the multiple visit events.

As one example, take an advertisement spot 'A' that is scheduled to air at 10:38 pm EST. If the baseline period and the measurement period are selected to have a duration of one hour, then the baseline may be defined as the total number of direct lead visits received by the network location during the 1 hour time period leading up to the start of the ad spot (e.g., 3,500 leads in this example). The total number of direct lead visits received by the network location during the measurement period may be measured beginning at the start of the ad spot and ending one hour later (e.g., 4,145 in this example). The baseline quantity may be subtracted from the total number of lead visits received during the measurement period in order to obtain the "lift"—i.e., the quantity of direct lead visits that may be attributed to the ad spot.

Using the values in the example above, a lift of 645 leads was measured for the ad spot. Therefore, 645 direct lead visits received during the measurement window via the "Direct" channel may be attributed to the "TV" channel. In other embodiments, those leads are merely associated with the "TV" channel while also retaining an association with the "Direct" channel. Those 645 leads (or specific lead visit records) may also be associated with the specific ad spot identifier along with any further metadata relating to the ad spot. In some embodiments, such associating of leads may be performed by changing or appending information in the lead database to indicate that those 645 lead visits were caused or influenced by the TV ad spot.

In some embodiments, the measurement period may be defined to be a sufficient length of time after the start of the advertisement spot that an entire increase in lead visits relative to the baseline may be reasonably attributed to the ad spot. Such a time period may vary depending on factors such as spot frequency, spot length, or other factors. In some embodiments, a lower spot frequency may require a longer measurement window (e.g., up to 1.5 hours or longer). In some embodiments, the measurement period may be anywhere between about 5 minutes and about three hours. In other embodiments, the measurement period may be between about 15 minutes and about 1.5 hours. In other embodiments, a measurement period may be defined based on an end time of a spot. For example, in some embodiments, a measurement window may extend from about 15 minutes to about 1.5 hours after the end time of a spot. In other embodiments, a long-term measurement may be made using baseline and measurement periods of weeks or months.

In some embodiments, individual leads to be attributed to a given offline ad spot may be selected at random. That is, of all of the leads arriving via the Direct channel during the measurement window, individual records selected at random may be attributed to the offline ad spot until the "lift" quantity of leads has been attributed. In some embodiments, leads to be attributed may be randomly selected from a set of leads that arrived within a time period (e.g. a day or day part) and/or from a geographic region associated with the time and geographic region in which the spot aired, or based on other known geographic or demographic information. In other embodiments, individual leads or lead visits to be associated with the TV channel may be selected according to an algorithm such as last-in-first-out or first-in-first out. For example, using a first-in-first-out algorithm, direct lead or lead visits may be counted as they arrive and once the count reaches the baseline, all leads arriving after that time may be attributed to the ad spot.

In other embodiments, individual leads to be associated with an offline ad spot may be identified based, at least in part, on correlations between metadata associated with the ad spot and metadata associated with one or more leads. For example, if the ad spot is associated with a particular geographic region (e.g., a broadcast region), then leads who are within the same geographic region who also visited the network location during the measurement period may be selected before leads outside of the geographic area. In other examples, correlations may be made based on demographic information or any other available metadata. In further embodiments, such metadata correlations may be used to assign weighting factors to leads, such that leads with strong metadata correlations may be selected at a higher frequency, but not exclusively of leads with weaker or no metadata correlations. Any statistical methods may be used to make such selections.

Figure 2:
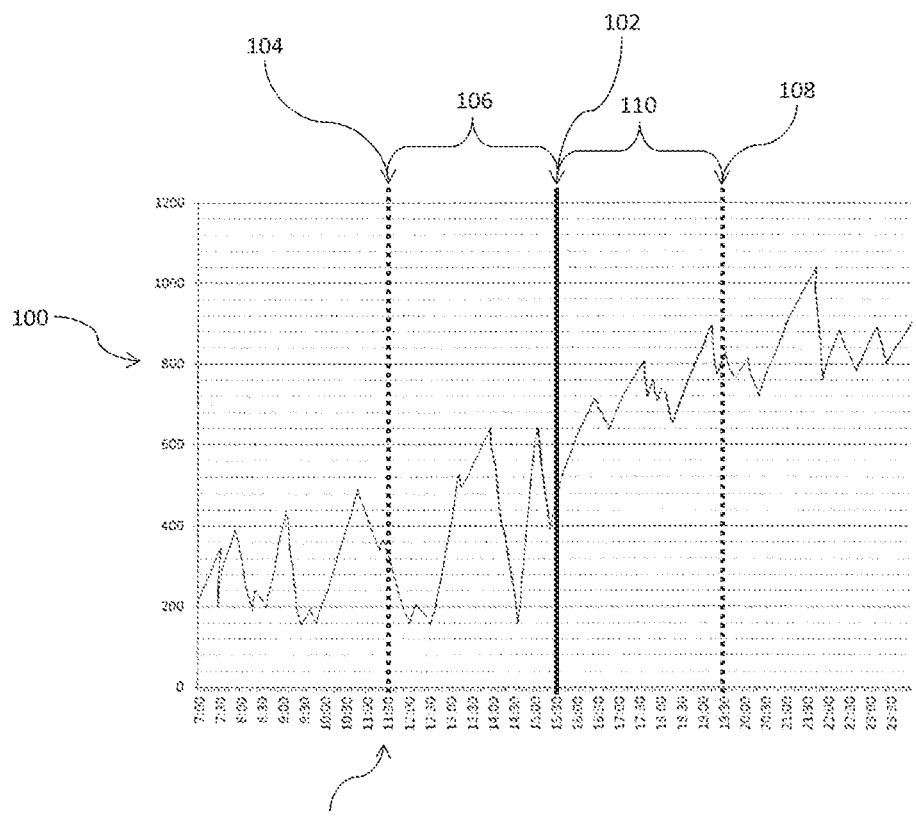
FIG. 2 is a graph of a number of visitors to a network location over time, illustrating a baseline time period and a measurement time period for evaluating the effectiveness of offline advertisements in driving online activity according to some embodiments.

Another example embodiment of a process for attributing online leads arriving via a single channel (such as the "Direct") channel to specific offline ad spots will now be described with reference to FIGS. 2 and 3. FIG. 2 illustrates a graph of number of lead visits received by a network location under evaluation on the vertical axis 100 and time increasing from left to right along the horizontal axis 112. The solid line 102 illustrates the start-time of an ad spot for which a direct (or other) channel lead measurement is to be taken. The left dashed line 104 represents the beginning of the baseline measurement period 106, and the dashed line on the right side 108 represents the end of a lead measurement period 110.

Figure 3:
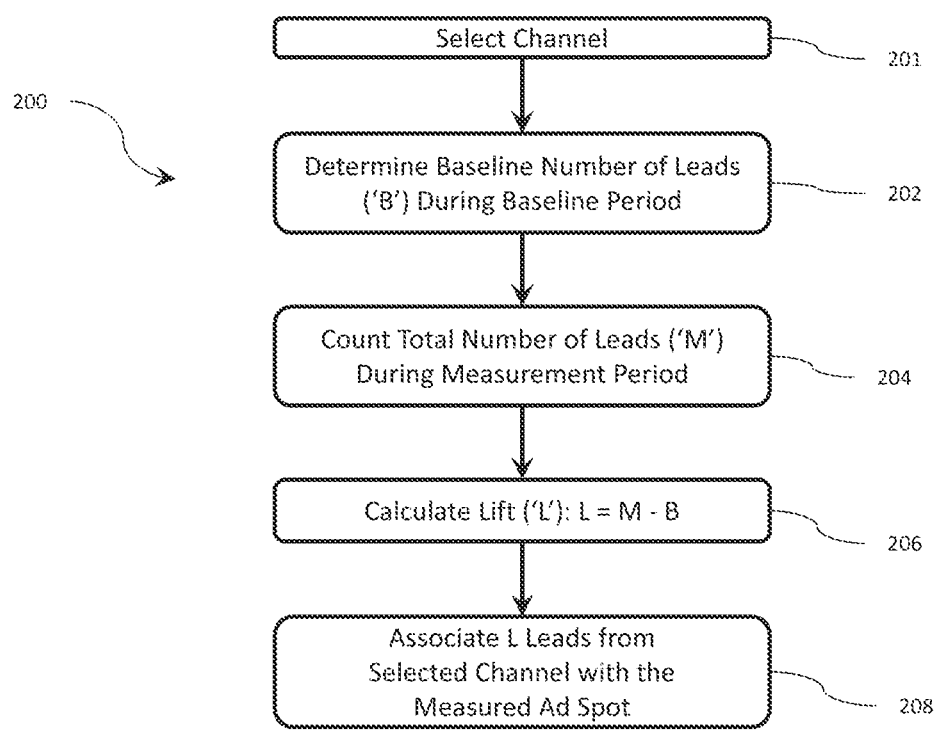
FIG. 3 is a process flow diagram illustrating a process for attributing web leads to a particular advertisement spot.

FIG. 3 illustrates an embodiment of a process flow diagram of a process 200 for attributing leads received via the direct channel to a particular advertisement spot. In some embodiments of such a process 200, a channel to be evaluated may be selected 201, and a baseline number of lead visits may be determined 202 during a baseline period (106 in FIG. 2). A total number of lead visits may be counted 204 during a measurement period (110 in FIG. 2), and a lift in the number of lead visits may be calculated 206 by subtracting the baseline quantity from the total number of lead visits received during the measurement period. A number of leads equal to the lift quantity may then be selected from the leads in the selected channel and the selected leads may be associated 208 with the advertisement spot which aired at the start of the measurement period.

In order to determine a baseline quantity ('B') of lead visits received during a "normal" time period, the system may count all lead visits received by the network location during the baseline period 106. All lead visits received during the measurement period 110 between the ad spot start time and the measurement period end point 108 may also be counted to obtain the lead measurement ('M'). Subtracting the baseline from the lead measurement yields the "lift" ('L') or the total increase in lead visits relative to the baseline during the measurement window.

In some embodiments, the baseline measurement period 106 may be the same length of time as the lift measurement period. In other embodiments, the baseline measurement period may be a longer or shorter duration than the lift measurement period. In some embodiments, when a baseline period is a different time length than the corresponding measurement period, a normalizing ration may be applied to one or both measured values. For example, if a measurement period is three times as long as a corresponding baseline period (e.g., a baseline period of 30 minutes and a measurement period of 90 minutes), a quantity of leads identified during the baseline period may be multiplied by three in order to normalize the baseline to the same time period as the measurement period.

In various embodiments, the length of the baseline and measurement periods may be determined manually, such as by empirical observation of results. In such embodiments, the length of a baseline and/or measurement period may be selected based on an analysis of traffic to the site for which leads are to be tracked. Depending on the frequency of visits to the site, a shorter or greater time period may be needed in order to collect a statistically significant number of visits to use as a baseline, and from which to calculate a lift quantity. Thus, an analysis of visit traffic to the site may be performed in order to determine the length of a baseline and/or measurement period during which a sufficient number of visits are likely to be seen. In some embodiments, the baseline and measurement periods may be evaluated after collecting information from leads during a substantial time period, such as weeks or months. In other embodiments, any other method for determining the lengths of the baseline and measurement periods may also be used.

In some cases, advertisement spots may run close enough together that the measurement period of a first (earlier) spot overlaps a measurement period of a second (later) spot. In some embodiments of such cases, each selected lead may be attributed to the ad spot with a start time closest to the time at which the lead visit occurred. In other embodiments of such cases, selected lead visits occurring during the overlapping time period may be attributed exclusively to the earlier ad spot or to the later ad spot. In still further embodiments, some or all lead visits received during such overlapping time periods may remain un-attributed. In other embodiments, ad spots may be processed in a sequence based on gross impressions or other ad spot metadata, such that more of the overlapping lift leads are attributed to a first ad spot, and the remainder may be attributed to the second (or third, etc.). In still other embodiments, a lift quantity for one or both of two overlapping ad spots may be constrained or refined based on observations of lead lifts from the same ad spot run during prior or subsequent times when there was no overlap.

In some embodiments, adjustments may need to be made to account for time zone differences. For example, a TV conversion attribution system may operate using a convention of Eastern Standard Time (EST), while advertisement spots may be aired in different regions of the country at different times. For example, a scheduled ad spot may be broadcast at the same local hour in multiple time zones. In other cases, an advertisement transmit during a live broadcast may be broadcast simultaneously in all time zones. For example, a live broadcast transmit at 8:00 PM EST would be broadcast in California at 5:00 PM PST.

In some cases, a number of lead visits received during a measurement period may be less than the number of lead visits received during a corresponding baseline period. In such situations, the resulting lift may simply be set to zero, meaning that no leads need be attributed to the ad spot. In other words, a negative lift quantity may be normalized to zero.

Cross-Channel Attribution of Leads to TV Ad Spots (Halo Effect)

Users do not all behave the same. As such, while some users who see an offline advertisement may simply type in a URL for the network location, others may use a search engine, a social network site, or any number of other avenues to seek further information about the entity or product that was the subject of the advertisement. Thus, at least some number of lead visits arriving through at least some other channels are likely influenced by television advertisements. Thus, in addition to attributing leads from the direct channel to an ad spot, it is also desirable to attribute leads from other channels to offline ad spots in proportion to a measured increase in lead visit traffic. These other channels will be collectively referred to herein as "indirect channels."

In some embodiments, increased lead visit traffic received by a network location via any of the indirect channels mentioned below may be attributed to an ad spot using the systems and methods described above. In other embodiments, lead visits received via indirect channels may be attributed to one or more ad spots using a similar, but slightly different approach. Attributing online activity to TV ads (or other offline advertisements) may generally involve adding an offline ad-spot association to leads (or lead visits) that would otherwise be attributed solely to an existing online channel. In some embodiments, the methods described below may also be applied to leads received via the direct channel.

In some embodiments, a process of attributing indirect channel leads to TV ad spots may proceed similarly to the process described above with reference to single-channel (e.g., direct channel) lead attribution with a few notable differences. For example, a substantially longer time period (e.g., weeks, months or longer) may be used for calculating an indirect channel baseline. Additionally, a lift in the number of indirect lead visits may be measured and attributed to TV advertisements on a rolling basis rather than within a fixed measurement window relative to a particular ad spot. Further differences exist in other methods of determining a number of leads to attribute to offline ads and in methods of attributing leads to specific Ad spots.

Table 2 illustrates examples of tracked channels that may receive increased traffic as an indirect result of television advertisements.

| Channel | Description |
| --- | --- |
| Organic Brand Search | SEO (Search Engine Optimization) for brand terms |
| Organic Non-Brand Search | SEO for non-brand terms |
| PPC Brand | SEM (Search Engine Monetization), search engine advertisements returned in response to brand search terms |
| PPC Non-Brand | SEM, search engine advertisements returned in response to non-brand search terms |
| Affiliates | Emails, blog posts or other information produced or distributed by affiliated sites or users |
| Display | Banner advertisements |
| Social | Social media sites such as Facebook, Twitter, Pinterest, LinkedIn, etc. |
| Re-targeting | Display Banner Campaigns |
| Print/Out-of-Home offline | Print, Direct Mail, Billboards, Point of Sales, 800 numbers, etc. |
| Online Video | Ads or links from online video sites such as YouTube, Hulu, etc. |
| Mobile | Digital Phones, Tablets |
| Other/WOM | Other Channel/Word-of Mouth |

Figure 4:
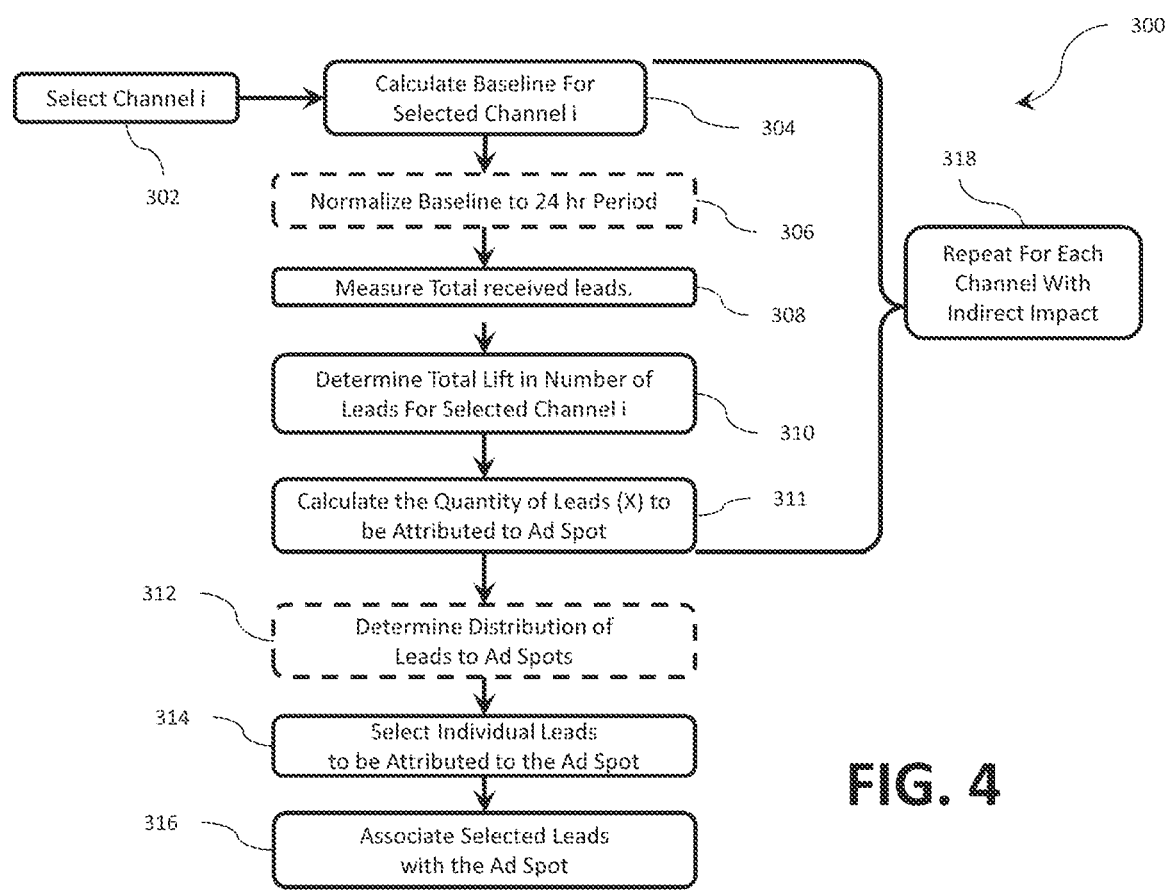
FIG. 4 is a process flow diagram illustrating a process for attributing web leads received via a plurality of indirect channels to a particular advertisement spot.

FIG. 4 illustrates an embodiment of a process 300 for attributing leads received through indirect online channels to specific TV advertisement spots. In the illustrated embodiment, the process may begin by choosing a channel 302. A baseline quantity of leads may then be determined 304 for the selected channel by analyzing historical web traffic data received through the selected channel. In some embodiments, the baseline quantity may then be normalized 306 to a 24 hour (or any other time duration) period. Then, during each 24 hour period, the number of leads received on the selected channel may be measured 308, and a lift quantity may be calculated 310 by subtracting the baseline from the total number of received leads. In other embodiments, the normalization step 306 may be omitted. As with previous embodiments, the lift quantity may represent the number of leads from the selected channel to be attributed 311 to one or more ad spots in the TV channel.

In some embodiments, a number of leads equal to the lift quantity ('X') may be attributed to specific advertisement spots in proportion to the gross impressions of each ad spot as reported by a television rating agency (e.g., NIELSEN). Thus, in some embodiments once a total number of leads from the selected channel to be attributed to offline ads is determined 311, a distribution of leads to ad spots may be determined 312. In some embodiments, a distribution of leads to ad spots may be determined based on a proportion of gross impressions for each ad spot. Individual leads, which may be selected at random or may be selected according to an algorithm 314 (e.g., as described above), may be attributed 316 to the ad spot which occurred nearest in time prior to the lead visit. In some embodiments, leads may be attributed to the ad spot that occurred nearest in time to the lead visit within a fixed time period relative to the lead visit. For example, a lead may be attributed 316 to the ad spot which occurred nearest in time within a 24 hour, 48 hour or other time period prior to the lead visit. The steps of selecting leads 314 and attributing leads 316 may be repeated until the total lift quantity ('X') of leads have been attributed to an ad spot. The above process may then be repeated 318 for each remaining indirect channel.

In some embodiments, the step of calculating a baseline 304 for each channel may include evaluating historical network traffic data (e.g., including data from all lead visits to a network location, and any associated data or metadata) received via the selected channel. In some embodiments, such historical analysis may be performed on a rolling basis. For example, in some embodiments details of all lead visit traffic to a network location may be monitored and stored over a substantial period of time (e.g., days, weeks, months, years), including information about specific leads, specific users, device fingerprints, channels, visit events, and any other information.

In some embodiments, establishing a baseline may be performed by calculating a daily average number of visit events received via one or more of the channels over a period of a week, a month, a year, etc. Such information may be updated on a rolling basis. For example, if data is updated on a rolling one-week basis, each successive day, the average may be calculated using data from the immediately prior seven days. Similarly, a monthly rolling average may be updated using information from the previous 30 days, or using any other length of time as desired. In some embodiments, a daily average may be determined for a particular channel by counting a total number of visits received via that channel for each day in a chosen time period, and then calculating a simple average of the daily totals. In other embodiments, a baseline may be calculated using a more complex algorithm. For example, intra-day variations in traffic may be detected, and a baseline may be defined as a polynomial or other function.

In some embodiments, determining a baseline 304 may further comprise measuring a baseline level of growth in lead visits received through a given channel. Under normal circumstances, a number of lead visits received through a given channel should increase as more users become aware of the network location and visit through the given channel. This normal level of growth may be measured over a period of time (e.g., about four weeks prior to beginning a TV advertising campaign, in some embodiments) in order to establish a baseline for normal lead levels accounting for normal growth in the absence of a TV or other offline ad campaign. In some embodiments, the baseline may also be further revised during a time period after an offline ad campaign is initiated (e.g., about four weeks in some embodiments). If data for a time period prior to initiating an offline ad campaign is not available, a baseline level of growth may be estimated based on short-term fluctuations in the number of received lead visits during and between the airing of ad spots.

In some embodiments, the baseline may be a single integer value. In other embodiments, a baseline may be a range of values representing a "normal" baseline number of visits. For example, in some embodiments a baseline may be defined as the average number of daily visits plus or minus one standard deviation. In still further embodiments, a baseline may be a time-varying function of network location visits vs. time. Such baseline functions may include linear functions, polynomial functions, multi-degree polynomial functions, or any other time-varying function In some embodiments, a lift quantity in a number of visits received through a particular channel may be determined by taking a simple difference between an actual number of received visits and a baseline number of visits (e.g., when the baseline is a single value). In other embodiments, when a baseline is defined as a range of values, a lift quantity in a number of visits received through a particular channel may be determined by subtracting a minimum baseline value, a maximum baseline value, or an average baseline value from an actual number of received visits, as long as the actual number of visits is greater than the minimum baseline value. In embodiments in which the baseline is a function, a lift quantity may be calculated by fitting a function to the actual visit data over a period of time (e.g., a 24 hour day) and mathematically finding the difference relative to the baseline function, by a numerical solution, or instantaneously by finding the difference between the actual visit data and the baseline function over short-time period segments (e.g., a short time segment may be 'x' seconds or minutes, where 'x' is any non-zero value).

In one example, a number of lead visits may be evaluated for multiple similar time periods. Time periods may be defined as "similar" based on any criteria as desired. In the following example, the "similar" time periods are 24-hour days beginning at 12:00 AM on Mondays. The data collected during such time periods may then be compared (such as by averaging) to detect trends. Subsequent time periods that are deemed to be similar to the evaluated time periods may then be assumed to follow the same pattern of visit activity under similar conditions. The model may then be divided into discrete segments, such as by defining a number of model-predicted visits during each minute of a Monday. Lift during each minute may then be calculated by subtracting the actual number of lead visits from the model-predicted value for that minute.

Figure 5:
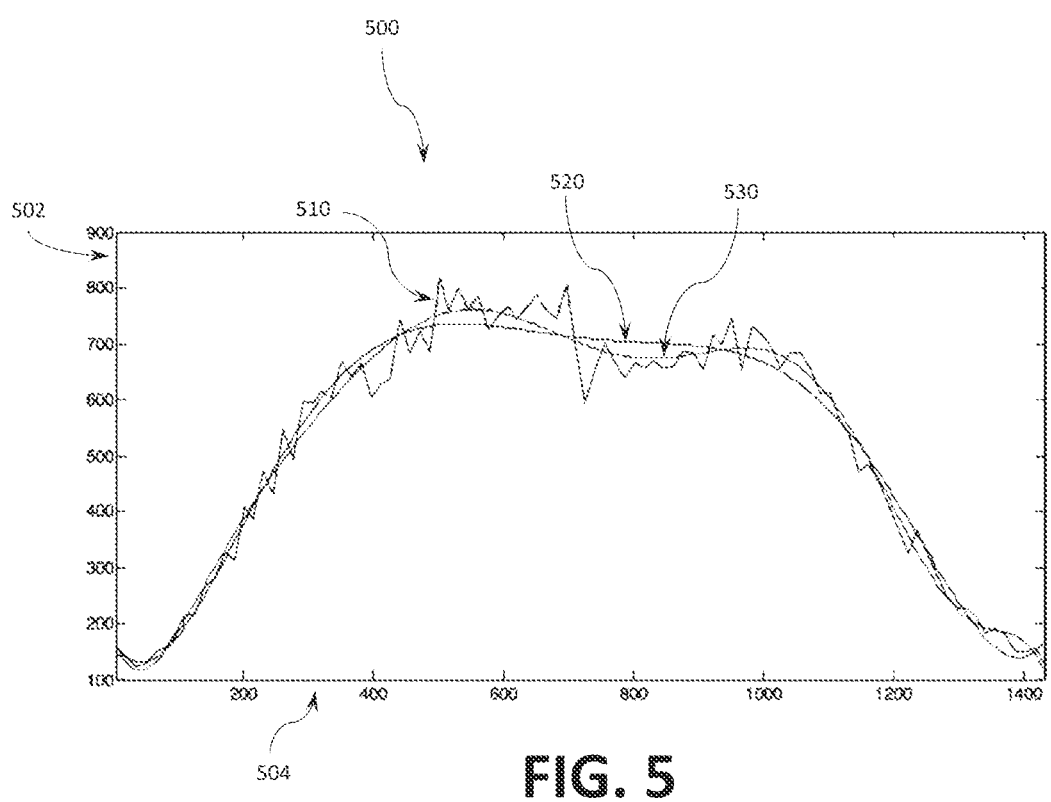
FIG. 5 is a graph of a number of visitors to a network location over time during a full day, including day-trend curves based on mathematical models.
Figure 6:
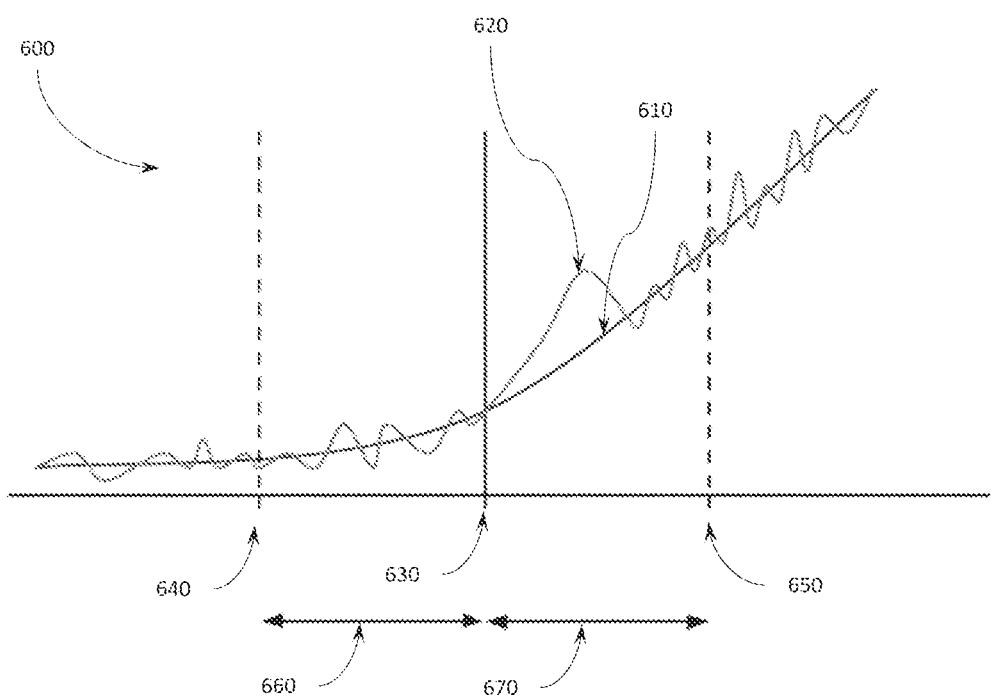
FIG. 6 is a graph of a number of visitors to a network location over time during a portion of a day, showing baseline and measurement time periods.

An example of calculating lift while removing the effects of a daily trend may be understood with reference to FIG. 5 and FIG. 6. The graph 500 of FIG. 5 illustrates embodiments of daily trend models 520, 530 compared with a plot of actual collected visit data 510. A number of unique visitors to a network location is plotted along the vertical axis 502 and time (in minutes) is plotted along the horizontal axis 504. The jagged line 510 is a plot of actual visit data, where each point represents a number of visitors within a 15-minute period. The actual data 510 may be modeled using a polynomial function. The two curved lines 520, 530 represent polynomial functions fit to the actual data, in which two distinct "bumps" can be seen in the middle of the day as well as significant upswing and downswing trends in the morning and in the evening. In this example, $6^{th}$ degree 520 and $10^{th}$ degree 530 polynomial functions were fit to the data. In addition to this one-day trend, several hours before and after the day may also be modeled to account for the attribution of spots with baseline or measurement windows overlapping the beginning or end of the day.

Once a daily trend model has been developed, the model may be used in calculating lift while accounting for daily trend variations in the number of lead visits.

FIG. 6 is a graph illustrating a segment of a daily trend line 610 and a plot 620 of the actual number of unique visitors to a network location detected during the same time period. The center solid line represents an ad spot start time 630, the left dotted line 640 marks the beginning of the baseline window period 66 (also referred to as the "pre-spot window" or the "pre window") and the right dotted line represents the end of the measurement window period 670 (also referred to as the "post-spot window" or the "post window").

Various algorithms may be used to calculate lift normalized by the daily trend model (or any other modeled trend). For example, in one embodiment, a lift calculation algorithm comprises:

Determining the total volume of visits predicted by the model during the pre window (V_model_pre) by evaluating each minute of the model falling within the pre window and summing the result, and determining the total volume of visits predicted by the model during the post window (V_model_post) in the same manner;

Determining the actual number of visits received during the pre window (V_actual_pre) by summing all visits received during the pre window, and similarly determining the actual number of visits received during the post window (V_actual_post);

Calculating a lift normalization factor (L_norm) using the equation:

$L\_norm = V\_model\_post - V\_model\_pre$

Calculate the raw lift factor (L_raw) using the equation:

$L\_raw = V\_actual\_post - V\_actual\_pre$

Calculate the normalized lift, (L_final) using the equation:

$MAX(0, L\_raw - L\_norm)$

In alternative embodiments, other algorithms may be used for calculating lift while removing increases attributable to daily or other trends.

Returning to FIG. 4, in some embodiments, calculating a baseline for a selected channel 304 may involve analysis of lead behavior over a long period of time (e.g., days, weeks, months, etc.) both before and after beginning an ad campaign to distinguish baseline leads from "lift" leads, and to distinguish "lift" from lead growth that may be attributable to other channel factors.

In an alternative embodiment of the process 300, the steps of calculating and normalizing a baseline may be omitted, and a "lift rate" may be assumed or calculated based on historical data for a particular channel. For example, in some embodiments a predetermined percent of total visits received via a given channel may be assumed to have been influenced by television advertisements. In some embodiments, such a predetermined percent value may be calculated based on historical data in a manner similar to that described above. For example, by comparing time periods during which the offline advertisements were not run with time periods when such offline ads were run, an average long-run lift rate may calculated or estimated. Using such a percentage approach, during any desired time period, a quantity of lead visits received via a particular channel may be attributed to the offline ads in proportion to the predetermined ratio.

Once a total number of leads to be attributed to one or more offline ads has been determined, the process 300 may begin to select individual leads from the selected indirect channel to be associated with the ad spot(s) in the appropriate offline channel. In some embodiments, each selected lead may be associated with a specific advertisement spot. For example, according to one embodiment, each selected lead may be associated with the ad spot that occurred closest in time prior to the time at which the lead visit was received. In other embodiments, further information may also be used to attribute leads to ad spots, including correlating geolocation or other metadata data from a lead to information defining a region to which ad spots were broadcast (e.g., geographic information, demographic information or time zone information).

In some embodiments, the leads to be attributed to offline ads may be selected at random. That is, of all of the leads in a given channel that may be selected for possible attribution to offline ads, individual lead records selected at random may be selected for offline attribution until the "lift" quantity of leads has been selected. In some embodiments, leads to be attributed may be randomly selected from a set of leads associated with visit events that occurred within a time period (e.g. on a particular day or during a particular day part) and/or from a geographic region associated with the time and geographic region in which the spot aired, or based on correlations with other known geographic, demographic or other associated information. In other embodiments, leads to be attributed may be selected based on additional qualifying information such as a number of previous visits to the site, a list of channels through which the lead has visited the network location, a list of devices associated with the same lead, an operating system or other software used by the lead, or other information.

In further embodiments, "lift" leads to be attributed to offline advertisements may be selected based on device fingerprint characteristics. For example, an analysis of historical data of patterns of visit events may reveal that after an offline advertisement event, an increased number of leads with particular fingerprint characteristics may be seen for a period of time. Thus, leads with that fingerprint characteristic may be weighted more heavily for offline attribution selection than other leads.

In some embodiments, the collection of leads selected for attribution to offline ads may be allocated to ad spots based on a distribution of gross impressions. For example, in some embodiments gross impression values may be obtained for all ad spots shown within a selected time period. In some embodiments, the selected time period may be 24 hours, while in other embodiments, the selected time period may be multiple days, a week, or longer. The portion of the collection of selected leads to be attributed to a given ad spot may be proportional to the ratio of gross impressions of that spot to the total gross impressions of all spots within the selected time period. In equation form:

$$L_s = P*(GI_s/GI_{total})$$

Where $L_s$ is the number of leads attributed to a given ad spot (or multiple spots), P is the total number of leads selected for attribution to offline ads (which may also be equal to the lift quantity), $GI_s$ is the gross impressions value for a single spot (s), and $GI_{total}$ is the sum of all gross impression values of all spots within the selected time period.

In any of the above embodiments, the lift rate (i.e., the lift quantity divided by a total number of received visit events during a given time period) may also be used for additional purposes beyond determining a number of leads to be attributed to one or more offline ads. For example, in some embodiments, a lift rate may represent (or may be proportional to) a probability that a person associated with a given lead actually saw the offline advertisement in question. In other embodiments, the lift rate may be used as (or may be proportional to) a contribution of a particular ad event to a final total sale amount associated with a particular lead.

In some embodiments, attribution of leads to spots may be organized into a plurality of Attribution Modes. These include a Live Mode for assessing lift attributable to live national broadcasts, a Dual Mode for assessing lift attributable to dual or multiple time zone broadcasts, a Local Mode for assessing lift attributable to broadcasts by local networks, a Halo mode for assessing lift attributable to long-term cross-channel effects, and an Assists Mode for assessing lift attributable to short-term cross-channel effects. Analysis may be organized into several jobs, one job for each combination of day, mode and media type. For 7 days (Monday through Sunday), 5 modes (Live, Local, Dual, Halo, Assists, and 2 media types (e.g., TV & Radio), 70 jobs may be created to measure one week's lead data.

In one example, the operation of processing jobs performed by a channel attribution engine for each attribution mode may be as follows:

For each Live Mode job
    Select only leads received through the Direct channel.
    Order spots for processing by time, Gross Impressions ("GI") and any special overriding configurations (e.g., always process NetworkX first).
    Obtain model of daily lead trends for entire day (e.g., based on day of week, including any seasonal or other trends).
    For each spot:
        Gather leads for 30 minutes prior to the spot start time and 90 minutes after the spot start time.
        Establish baseline for pre-spot window.
        Establish lift for post-spot window after accounting for daily trend and pre/post window normalization.
        Sample lift leads from post-spot window leads, and attribute sampled leads to the spot.

For each Dual Mode job
    For each time zone
        Select only leads received through the Direct channel during the analyzed day.
        Order spots for processing by time, GI and any special overriding configurations.
        Obtain model of daily lead trends for entire day.
        For each spot
            Gather leads for 30 minutes prior to the spot start time and 90 minutes after the spot start time.
            Establish baseline for pre-spot window.
            Establish lift for post-spot window after accounting for daily trend and pre/post window normalization.
            Sample leads from post-spot window leads, and attribute sampled leads to the spot.

For each Local Mode job
    Select only leads received through the Direct channel.
    Order spots for processing by time, GI and any special overriding configurations.
    Obtain model of daily trends for entire day.
    For each spot
        Filter leads by location using zip and city and state (e.g., based on geolocation data associated with lead's IP address).
        Gather leads for 30 minutes prior to the spot start time and 90 minutes after the spot start time.
        Establish baseline for pre-spot window.
        Establish lift for post-spot window after accounting for daily trend and pre/post window normalization.
        Sample lift from post-spot window leads and attribute sampled leads to the spot.

For each Assists Mode job
    Select leads from all channels except the Direct channel
    Order spots for processing by time, GI and any special overriding configurations.
    Obtain model of daily trends for entire day.
    For each spot For each channel other than Direct
  Gather leads for 30 minutes prior to the spot start time and 90 minutes after the spot start time.
  Baseline is established for pre window.
  Establish lift for post-spot window after accounting for daily trend and pre/post window normalization.
  Sample lift from post-spot window leads and attribute sampled leads to the spot.
For each Halo Mode job
  Select leads from all channels except the Direct channel.
  Order spots for processing by time, GI and any special overriding configurations made.
  Obtain model of daily trends for entire day
  For each spot
    For each channel
      Obtain channel-specific lift coefficient from database (e.g., obtained as the average ratio of lift to total leads from the trailing 6-month period or as the average of lifts determined by comparing long periods of offline ad-free time with similar time periods during which offline ads are run).
      Apply lift coefficient to all un-attributed leads (i.e., any leads not attributed to a spot in any of the preceding attribution modes) received for a long period of time after the spot start time (e.g., 1 day, 1 week or 1 month).

Using TV Attribution Data

After leads from the direct channel and/or various other indirect channels have been attributed to one or more offline ad spots as described above, the leads associated with the TV channel may be tracked for any and all subsequent conversion activities (or other activities of interest) in the same manner as with other channels. For example, if a user behind a lead in the TV channel makes a purchase or performs another action defined as a "conversion," various metrics of credit for that conversion may be entirely or partially attributed to one or more television advertisements with which the lead is associated. In some embodiments, each conversion event may be associated with a one or more amounts, representing total revenue, profit, ROI, page views or other measures of value received from the conversion.

As a result, over time, quantitative and qualitative conversion data may be aggregated for each advertisement spot and/or by other meta-data associated with each ad spot. For example, conversion data may be aggregated by time slot, audience demographic data, audience geographic data, television program during which ads were run, Nielsen demographic data describing a television audience, or any other data that may be associated with an ad spot. Aggregated lead and conversion data may be analyzed and presented using any suitable statistical or other techniques available.

Aggregated conversion data may then be used to evaluate the effectiveness of specific ad spots, or of advertising strategies (e.g., advertising during particular time slots, on a particular network, during a particular program, in a particular geographic region, or to a particular demographic group). For example, effectiveness of an ad spot may be evaluated by calculating a return-on-investment (ROI) for the ad spot, total profit associated with an ad spot, or total revenue associated with an ad spot. Alternatively, the effectiveness of an ad spot may be evaluated based on a number of conversions, number of leads, number of conversions per spot, number of leads per spot, and/or based on various cost metrics such as cost per spot, cost per network, cost per daypart, cost per program, cost per creative, cost per day of week, etc. In some embodiments an ROI may be calculated by dividing total revenue from tracked conversion activity by a total cost of the ad spot. Similar calculations may be performed for determining the ROI, profit, revenue or other value metrics for various advertising strategies, demographics, time slots, geographic regions, networks, programs, etc. In other embodiments, ROI may be determined based on cost metrics with various denominators, such as cost per spot, cost per network, cost per daypart, cost per program, cost per creative, cost per day of week, etc.

Case Examples

An example of a lead determination measurement is provided below, illustrating some embodiments of the systems and methods described herein. These examples are provided for illustration and are not intended to be limiting.

In the following example of lead attribution for a single ad spot, a lead is defined as including all visits to the monitored network location, whether those visitors are first-time visitors or returning visitors. In the following example, a conversion is defined to include only sales events, the pre-spot window is defined as 30 minutes, and the post-spot window is defined as 90 minutes. In this example, the network location received a total of 150 leads, 13 of which were received during the baseline (pre-spot) window and 137 of which were received during the measurement (post-spot) window. Using a window normalization factor of 3 (90 minutes/30 minutes), a lift value of 98 may be calculated (137−3*13). In this example, a daily normalization trend (e.g., based on a historical analysis of similar time periods) indicates that a typical increase of seven leads may be expected over the pre and post windows. As a result, the lift value may be reduced by 7 to account for the daily trend, yielding a revised lift of 91.

In some cases, a long-term trend (e.g., based on monthly, seasonal yearly averages) may indicate that the lift should be further reduced. For example, a lift rate may be calculated for one or more similar ad spots in the past (e.g., same time of day, same day of the week, same program, same network, etc.) by calculating the lift attributable to those spots as a percent of the total number of leads received during the relevant measurement windows. Such lift rates may be averaged over time, or may be used individually to inform a new measurement. For example, if a historical lift rate is 64% of received leads while the current measurement suggests a higher lift rate of 66%, then the lower rate may be used in place of the new measurement, or the new rate and the historical rate may be averaged. Continuing the above example, the lift may be reduced from 91 to 88 following an adjustment for a long-term trend.

Once lift is determined, the leads may be sampled to select individual visitors to associate with the ad spot. In some cases, sampling may be performed minute-by-minute, whereby for each minute during the sampling window, leads received during that minute may be sampled if the number of actual received leads exceeds the number of leads predicted by the daily trend model for that minute. Leads received during that minute may be filtered (e.g., by geography) and then sorted (e.g., chronologically) and then sampled up to a number corresponding to the lift rate. Alternatively, a similar process may be used for time blocks greater or less than one minute.

In a further example, we assume the following results were obtained over the course of one week:100,000 total leads were received, 10,000 conversions were attributed to 100 ad spots, each ad spot having been purchased at a cost of $500. Also during this time, a lift rate of 60% was determined. Thus, 60,000 of these leads may be attributed to ad spots. However, only 5,000 of the conversions received during the week were attributable to this week's leads.

Using the lead recognition engine 22, the activity tracking system 20, and the lead database 50 of FIG. 1, any subsequent actions (e.g., conversions) performed by a visitor associated with any one of the leads attributed to a spot may also be attributed to the spot. As such, any conversions (and associated revenue and profit) performed by those attributed leads may be associated with one or more ad spots.

Once attribution has been completed, and once subsequent conversion data has been collected, the resulting raw or aggregated data may be presented to a user or may be further analyzed and evaluated to determine advertising spot effectiveness. For example, the performance of TV and/or radio advertisement may be grouped and viewed by network, TV/radio program, day part, creative (i.e., the unique content of the ad spot), time, ISCI (Industry Standardized Commercial Identifier) code, country, state, etc.

Metrics by which such performance may be evaluated and presented may include number of spots, total leads, cost, profit, revenue, ROI, cost per lead, cost per conversion, leads per spot, total conversions, conversions per spot, conversion rate (conversions/total attributed leads), cost per spot, or any other suitable metric.

Continuing the above example, dividing the week's total ad expense ($500*100 spots=$50,000) by the number of leads (60,000) reveals a cost per lead of $0.83. Similarly, dividing total ad expense ($50,000) by the number of conversions (5,000) yields the week's cost per conversion of $10. Assuming each converted lead is associated with a long-term value (LTV) of $50, this week's 500 conversions create $200,000 in forecasted future profit (=($50 LTV−$10 cost)×5000 conversions).

Any of the foregoing methods or embodiments may be performed entirely based on data stored in the lead database 50 of FIG. 1. In such embodiments, lead visits need not be counted in real-time. Similarly, baseline quantities, measurement quantities, and lift quantities may be, but need not be calculated or otherwise determined in real-time. Performing such analyses on historical data without the constraints of immediate real-time processing may allow for more complex analysis of available data. Alternatively, some steps may be performed in real-time as needed.

All of the features and functions described above may be performed automatically by a computer system that comprises one or more computing devices, each of which includes a processor containing digital logic circuitry. The disclosed functions and features may, in some implementations, be embodied within program code (instructions) that are executed by the computer system. The program code may be stored in non-transitory computer storage, such as one or more disk drives, solid-state memory drives, or other types of storage devices. Some or all of the disclosed functions may alternatively be implemented in application-specific hardware (e.g., ASICs, FPGAs, etc.) of the computer system.

The specific embodiments above are intended to be illustrative and not limiting. For example, although many of the above embodiments are described with reference to attributing online behavior with television advertisements, the same systems and methods may be used for attributing online behavior to other form of "offline" advertisement, such as radio ads, print ads, endorsements, etc. Additional embodiments are within the broad concepts described herein. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

In particular, a variety of hardware and software implementation details and techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the commonly used phrase "and/or." Thus, for example the phrase "A or B may be blue" may mean any of the following: A alone is blue, B alone is blue, both A and B are blue, and A, B and C are blue. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

What is claimed is:

1. A computer-implemented method of attributing online activities to first and second offline events, the method comprising:
   determining online interactions of a website, wherein the online interactions occur prior to a first offline event or prior to a second offline event, the online interactions prior to the second offline event including the online interactions prior to the first offline event;
   determining a lift quantity by subtracting a total quantity of the online interactions prior to the second offline event by a total quantity of the online interactions prior to the first offline event; and
   selecting online interactions prior to the second offline event to be associated with the first offline event and the second offline event until a total quantity of the associated online interactions equals the lift quantity.

2. The computer-implemented method of claim 1, wherein selecting online interactions comprises randomly selecting the online interactions.

3. The computer-implemented method of claim 1, wherein selecting online interactions comprises selecting the online interactions based on at least one demographic datum associated with the online interactions.

4. The computer-implemented method of claim 1, wherein the first and second offline events are television and/or radio airings.

5. The computer-implemented method of claim 1, wherein associating each of the selected online interactions with one of the first and second offline events comprises associating each of the selected online interactions based on when each of the first and second offline events occurred.

6. The computer-implemented method of claim 1, wherein selecting online interactions prior to the second offline event to be associated with the first offline event and the second offline event comprises associating each of the online interactions based on location information related to each of the first and second offline events.

7. The computer-implemented method of claim 6, wherein the location information includes geographic information, demographic information, and/or time zone information.

8. A system for attributing online activities to first and second offline events, the system comprising:
- at least one data storage device storing instructions for attributing online activities to first and second offline events; and
- at least one processor that, upon executing the instructions for attributing online activities to first and second offline events, executes a method comprising:
  - determining online interactions of a website, wherein the online interactions occur prior to a first offline event or prior to a second offline event, the online interactions prior to the second offline event including the online interactions prior to the first offline event;
  - determining a lift quantity by subtracting a total quantity of the online interactions prior to the second offline event by a total quantity of the online interactions prior to the first offline event; and
  - selecting online interactions prior to the second offline event to be associated with the first offline event and the second offline event until a total quantity of the associated online interactions equals the lift quantity.

9. The system of claim 8, wherein selecting online interactions comprises randomly selecting the online interactions.

10. The system of claim 8, wherein selecting online interactions comprises selecting the online interactions based on at least one demographic datum associated with the online interactions.

11. The system of claim 8, wherein the first and second offline events are television and/or radio airings.

12. The system of claim 8, wherein associating each of the selected online interactions with one of the first and second offline events comprises associating each of the selected online interactions based on when each of the first and second offline events occurred.

13. The system of claim 8, wherein selecting online interactions prior to the second offline event to be associated with the first offline event and the second offline event comprises associating each of the online interactions based on location information related to each of the first and second offline events.

14. The system of claim 13, wherein the location information includes geographic information, demographic information, and/or time zone information.

15. A non-transitory computer-readable medium storing instructions that execute a method comprising:
- determining online interactions of a website, wherein the online interactions occur prior to a first offline event or prior to a second offline event, the online interactions prior to the second offline event including the online interactions prior to the first offline event;
- determining a lift quantity by subtracting a total quantity of the online interactions prior to the second offline event by a total quantity of the online interactions prior to the first offline event; and
- selecting online interactions prior to the second offline event to be associated with the first offline event and the second offline event until a total quantity of the associated online interactions equals the lift quantity.

16. The non-transitory computer-readable medium of claim 15, wherein selecting online interactions comprises randomly selecting the online interactions.

17. The non-transitory computer-readable medium of claim 15, wherein selecting online interactions comprises selecting the online interactions based on at least one demographic datum associated with the online interactions.

18. The non-transitory computer-readable medium of claim 15, wherein the first and second offline events are television and/or radio airings.

19. The non-transitory computer-readable medium of claim 15, wherein associating each of the selected online interactions with one of the first and second offline events comprises associating each of the selected online interactions based on when each of the first and second offline events occurred.

20. The non-transitory computer-readable medium of claim 15, wherein selecting online interactions during the second offline event to be associated with the first offline event and the second offline event comprises associating each of the online interactions based on location information related to each of the first and second offline events, and wherein the location information includes geographic information, demographic information, and/or time zone information.

* * * * *